(12) United States Patent
Torisaki et al.

(10) Patent No.: US 12,323,451 B2
(45) Date of Patent: Jun. 3, 2025

(54) INFORMATION OUTPUT DEVICE, INFORMATION OUTPUT METHOD, AND RECORDING MEDIUM

(71) Applicant: Panasonic Automotive Systems Co., Ltd., Kanagawa (JP)

(72) Inventors: Yuishi Torisaki, Osaka (JP); Kaoru Yokota, Hyogo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 19/025,713

(22) Filed: Jan. 16, 2025

(65) Prior Publication Data

US 2025/0159010 A1    May 15, 2025

Related U.S. Application Data

(63) Continuation of application No. PCT/JP2023/034110, filed on Sep. 20, 2023.

(30) Foreign Application Priority Data

Oct. 14, 2022    (JP) .................................. 2022-165404

(51) Int. Cl.
    *H04L 9/40*          (2022.01)
(52) U.S. Cl.
    CPC ................................ *H04L 63/1425* (2013.01)
(58) Field of Classification Search
    CPC . H04L 63/1425; H04L 43/04; H04L 63/1416; H04L 43/02; H04L 43/06; H04W 4/48
    See application file for complete search history.

(56) References Cited

U.S. PATENT DOCUMENTS 11,625,237 B2 *  4/2023  Decrop ............... H04L 63/1425
                                                    717/106
2011/0085798 A1   4/2011  Kikuchi
                        (Continued)

FOREIGN PATENT DOCUMENTS

| JP | H08-211925 A   | 8/1996 |
| JP | 2011-086980 A  | 4/2011 |
| JP | 2020-129238 A  | 8/2020 |

OTHER PUBLICATIONS

Farshchi et al., "Contextual anomaly detection for a critical industrial system based on logs and metrics," 2018 14th European Dependable Computing Conference (EDCC) Year: 2018 | Conference Paper | Publisher: IEEE.*

(Continued)

*Primary Examiner* — Roderick Tolentino
(74) *Attorney, Agent, or Firm* — GREENBLUM & BERNSTEIN, P.L.C.

(57) ABSTRACT

An information output device that outputs monitoring information including monitoring logs generated by monitoring devices, and includes: memory; and a processor coupled to the memory. The processor, by using the memory, operates as: a receiver that sequentially receives monitoring logs, each including a monitoring result indicating whether a monitoring target has an anomaly; a manager that manages, based on the monitoring logs, a first state that is a state of anomaly occurrence in a monitoring target of each of the monitoring devices; a storage that stores path information indicating transmission paths, each indicated by one or more devices through which a monitoring log transmitted by a source passes; a determiner that determines the reliability level of each received monitoring log based on a first transmission path of the monitoring log and the first state;

(Continued)

and an outputter that outputs, based on the reliability level, monitoring information including the monitoring log.

13 Claims, 14 Drawing Sheets

(56) References Cited

U.S. PATENT DOCUMENTS

| | | | | |
|---|---|---|---|---|
| 2015/0156212 | A1* | 6/2015 | Khatri | H04L 63/1425 726/23 |
| 2015/0242266 | A1* | 8/2015 | Kori | G06F 11/0721 714/57 |
| 2017/0208080 | A1* | 7/2017 | Sakamoto | G06N 20/00 |
| 2021/0194904 | A1* | 6/2021 | Zhang | G05D 1/0088 |
| 2021/0288981 | A1* | 9/2021 | Numainville | H04L 63/1416 |
| 2021/0377288 | A1* | 12/2021 | Chen Kaidi | H04L 63/1416 |
| 2021/0385245 | A1* | 12/2021 | Melson | H04L 63/1433 |
| 2023/0177380 | A1* | 6/2023 | Bansal | G06N 20/00 706/12 |
| 2023/0376743 | A1* | 11/2023 | Nikolic | G06N 3/045 |

OTHER PUBLICATIONS

Lupton et al., "Assessment of Real-World Incident Detection Through a Component-Based Online Log Anomaly Detection Pipeline Framework," 2023 10th International Conference on Dependable Systems and Their Applications (DSA) Year: 2023 | Conference Paper | Publisher: IEEE*
International Search Report issued in WIPO Patent Application No. PCT/JP2023/034110, dated Nov. 7, 2023, along with an English translation thereof.
Written Opinion of the International Searching Authority (WO/ISA) issued WIPO Patent Application No. PCT/JP2023/034110, dated Nov. 7, 2023, along with an English translation thereof.

* cited by examiner

FIG. 4

| In-vehicle apparatus | Anomalous device |
|---|---|
| - | - |
| - | - |
| ... | ... |

FIG. 5

| In-vehicle apparatus | Anomalous device |
|---|---|
| In-vehicle apparatus 210 | RI monitoring device 213 |
| - | - |
| - | - |
| ... | ... |

FIG. 6

| In-vehicle apparatus | Anomalous device | Anomaly state |
|---|---|---|
| In-vehicle apparatus 210 | RI monitoring device 213 | Anomalous |
| In-vehicle apparatus 210 | Monitoring device 212 | Low reliability |
| In-vehicle apparatus 210 | Transmission device 215 | Low reliability |
| ... | ... | ... |

FIG. 7

| Source | Transmission path |
|---|---|
| Monitoring device 212 | Monitoring device 212 ⇒ RI monitoring device 213 ⇒ Transmission device 215 |
| RI monitoring device 213 | RI monitoring device 213 ⇒ Transmission device 215 |
| Monitoring Root 214 | Monitoring Root 214 ⇒ Transmission device 215 |

| In-vehicle apparatus | Monitor | Monitoring target | Monitored details |
|---|---|---|---|
| In-vehicle apparatus 210 | Monitoring device | Monitored app | Anomalous operation such as access violation |
| | RI monitoring device | Monitoring device | Runtime integrity (Integrity) |
| | RI monitoring device | Transmission device | Runtime integrity (Integrity) |
| | Monitoring Root | RI monitoring device | Runtime integrity (Integrity) |
| In-vehicle apparatus 220 | ... | ... | ... |
| ... | ... | ... | ... |

| Destination information | Source information | Timestamp | Anomaly detection ID | Anomaly detection detail log |

FIG. 10

| Destination information | Source information | Reliability level information | Timestamp | Anomaly detection ID | Anomaly detection detail log |

INFORMATION OUTPUT DEVICE, INFORMATION OUTPUT METHOD, AND RECORDING MEDIUM

CROSS REFERENCE TO RELATED APPLICATIONS

This is a continuation application of PCT International Application No. PCT/JP2023/034110 filed on Sep. 20, 2023, designating the United States of America, which is based on and claims priority of Japanese Patent Application No. 2022-165404 filed on Oct. 14, 2022.

FIELD

The present disclosure relates to an information output device, an information output method, and a recording medium.

BACKGROUND

PTL 1 discloses a technique in which a monitor in an insecure area monitors an electronic control device to generate logs, which are then collected by a log collector in a secure area. The disclosed technique also involves transferring the collected logs to a security operation center (SOC).

CITATION LIST

Patent Literature

PTL 1: Japanese Unexamined Patent Application Publication No. 2020-129238

SUMMARY

However, the system according to PTL 1 can be improved upon.

In view of this, the present disclosure provides an information output device and the like capable of improving upon the above related art.

An information output device according to one aspect of the present disclosure is an information output device that receives monitoring logs generated by a plurality of monitoring devices including a first monitoring device and a second monitoring device, and outputs monitoring information including the monitoring logs, the second monitoring device monitoring the first monitoring device and having security privilege higher than security privilege of the first monitoring device. The information output device includes: a receiver that sequentially receives monitoring logs, each monitoring log including: device information indicating one monitoring device of the plurality of monitoring devices; and a monitoring result indicating whether a monitoring target of the one monitoring device has an anomaly; a manager that manages a first state based on the monitoring result included in each monitoring log sequentially received, the first state being a state of anomaly occurrence in the monitoring target of each of the plurality of monitoring devices; a storage that stores path information indicating transmission paths, each transmission path having a different one of the plurality of monitoring devices as a source of a monitoring log, each transmission path being indicated by one or more devices through which a monitoring log transmitted by the source passes; a determiner that identifies, based on a first transmission path in the path information corresponding to the monitoring target of the monitoring device indicated by the device information included in the received monitoring log, and based on the first state, a second state that is a state of anomaly occurrence in a monitoring target of each of the one or more monitoring devices indicated by the first transmission path, and determines, based on the identified second state, a reliability level of the received monitoring log; and an outputter that outputs, based on the reliability level, monitoring information including the monitoring log.

Moreover, an information output method according to one aspect of the present disclosure is an information output method that includes: receiving monitoring logs generated by a plurality of monitoring devices including a first monitoring device and a second monitoring device; and outputting monitoring information including the monitoring logs, the second monitoring device monitoring the first monitoring device and having security privilege higher than security privilege of the first monitoring device. The information output method includes: sequentially receiving monitoring logs, each monitoring log including: device information indicating one monitoring device of the plurality of monitoring devices; and a monitoring result indicating whether a monitoring target of the one monitoring device has an anomaly; managing a first state based on the monitoring result included in each monitoring log sequentially received, the first state being a state of anomaly occurrence in the monitoring target of each of the plurality of monitoring devices; obtaining path information indicating transmission paths, each transmission path having a different one of the plurality of monitoring devices as a source of a monitoring log, each transmission path being indicated by one or more devices through which a monitoring log transmitted by the source passes; identifying, based on a first transmission path in the path information corresponding to the monitoring target of the monitoring device indicated by the device information included in the received monitoring log, and based on the first state, a second state that is a state of anomaly occurrence in a monitoring target of each of the one or more monitoring devices indicated by the first transmission path; determining, based on the identified second state, a reliability level of the received monitoring log; and outputting, based on the reliability level, monitoring information including the monitoring log.

It is to be noted that these general and specific aspects may be implemented using a system, a method, an integrated circuit, a computer program, or a computer readable recording medium such as a CD-ROM, or any combination of systems, methods, integrated circuits, computer programs, or recording media.

The information output device and the like according to the present disclosure enables outputting monitoring information that enables a device receiving a monitoring log to readily determine whether the monitoring log is reliable.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 4 is a diagram illustrating an example of the anomaly information before monitoring logs are generated.

FIG. 5 is a diagram illustrating an example of the anomaly information after a monitoring log is generated.

FIG. 6 is a diagram illustrating another example of the anomaly information after monitoring logs are generated.

FIG. 7 is a diagram illustrating an example of the path information in the embodiment.

FIG. 8 is a diagram illustrating an example of the relationship information in the embodiment.

FIG. 9 is a diagram illustrating an example of the format of a monitoring log in the embodiment.

FIG. 10 is a diagram illustrating an example of the format of monitoring information in the embodiment.

DESCRIPTION OF EMBODIMENT

Circumstances Leading to the Present Disclosure

Figure 1:
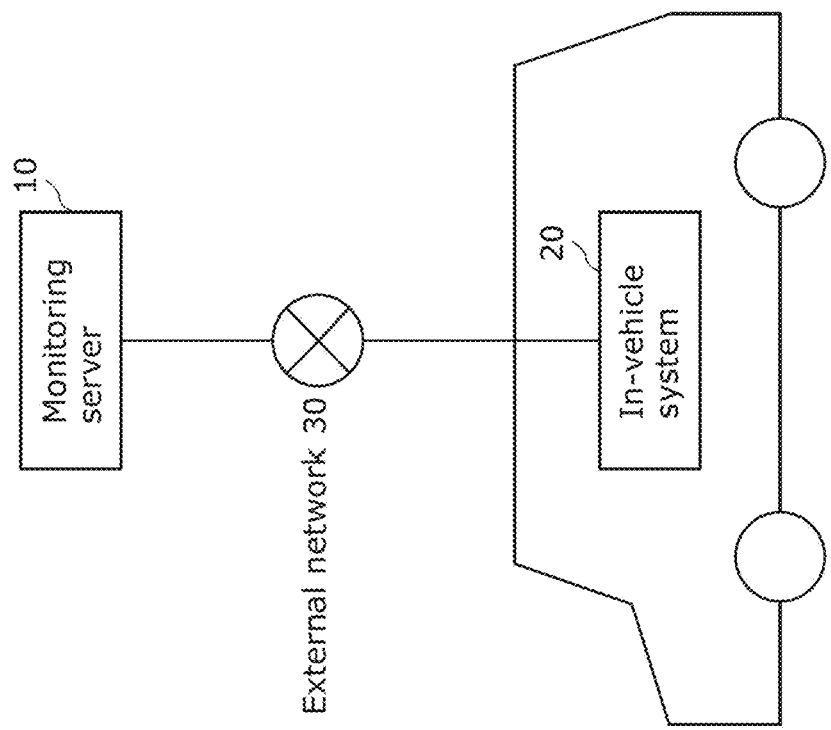
FIG. 1 is a diagram illustrating the general configuration of a monitoring system in an embodiment.

Monitoring logs that include monitoring results related to the security of a vehicle need to be collected, stored, and transmitted to an SOC in a secure manner. Unfortunately, the aforementioned conventional technique does not ensure the integrity of the operations of monitoring, log storage, and log transmission, thus preventing determination as to whether logs transmitted to the SOC are reliable. Without assurance of the integrity of the operations of monitoring, log storage, and log transmission, an anomaly in these operations may cause an anomalous log to be transmitted to the SOC. As an example, an anomalous monitoring operation may generate an anomalous log. As another example, an anomalous log storage or transmission operation may change a normal log into an anomalous log, or conversely, change an anomalous log into a normal log.

In view of the above, the inventors have found that, for accurate monitoring-log analysis and reliable monitoring logs in an SOC, it is necessary to not only protect the monitoring logs (e.g., conceal the logs or protect the logs against tampering) but also ensure the integrity of the operations of monitoring, monitoring-log storage, and monitoring-log transmission.

As described above, the conventional technique in PTL 1 does not ensure the integrity of the monitoring operations nor the integrity of the operations of transmitting the logs to the SOC. Consequently, the logs transmitted to the SOC may be unreliable.

The present disclosure provides an information output device and the like for outputting monitoring information that enables a device receiving a monitoring log to readily determine whether the monitoring log is reliable.

An information output device according to a first aspect of the present disclosure is the information output device that receives monitoring logs generated by a plurality of monitoring devices including a first monitoring device and a second monitoring device, and outputs monitoring information including the monitoring logs, the second monitoring device monitoring the first monitoring device and having security privilege higher than security privilege of the first monitoring device. The information output device includes: a receiver that sequentially receives monitoring logs, each monitoring log including: device information indicating one monitoring device of the plurality of monitoring devices; and a monitoring result indicating whether a monitoring target of the one monitoring device has an anomaly; a manager that manages a first state based on the monitoring result included in each monitoring log sequentially received, the first state being a state of anomaly occurrence in the monitoring target of each of the plurality of monitoring devices; a storage that stores path information indicating transmission paths, each transmission path having a different one of the plurality of monitoring devices as a source of a monitoring log, each transmission path being indicated by one or more devices through which a monitoring log transmitted by the source passes; a determiner that identifies, based on a first transmission path in the path information corresponding to the monitoring target of the monitoring device indicated by the device information included in the received monitoring log, and based on the first state, a second state that is a state of anomaly occurrence in a monitoring target of each of the one or more monitoring devices indicated by the first transmission path, and determines, based on the identified second state, a reliability level of the received monitoring log; and an outputter that outputs, based on the reliability level, monitoring information including the monitoring log.

Thus, the reliability level of a monitoring log is determined based on the second state, which is the state of anomaly occurrence in each of the one or more devices indicated by the transmission path. For example, if any of the one or more devices through which a monitoring log has passed has an anomaly, the reliability level may be determined to indicate low reliability of the monitoring log. In this manner, the monitoring information can be output that enables a device receiving a log to readily determine whether the log is reliable.

The information output device according to a second aspect of the present disclosure is the information output device according to the first aspect. In the information output device according to the second aspect, a plurality of devices including the plurality of monitoring devices constitute a plurality of monitoring relationships, each of the plurality of monitoring relationships indicates a pair of a monitor and a monitoring target, the storage stores relationship information indicating the plurality of monitoring relationships, and based on the first transmission path, the first state, and the relationship information, the determiner identifies the second state as (i) normal, (ii) anomalous, or (iii) being monitored by an anomalous device having an anomaly among the plurality of devices.

Thus, the reliability level of a monitoring log is determined based on the second state identified as (i) normal, (ii) anomalous, or (iii) being monitored by an anomalous device. For example, if any of the one or more devices through which a monitoring log has passed has an anomaly or is being monitored by an anomalous device, the reliability level may be determined to indicate low reliability of the monitoring log. In this manner, the monitoring information can be output that enables a device receiving a log to readily determine whether the log is reliable.

The information output device according to a third aspect of the present disclosure is the information output device according to the second aspect. In the information output device according to the third aspect, a first reliability level of a first monitoring log that has passed through a device being monitored by the anomalous device is determined to be higher than a second reliability level of a second monitoring log that has passed through the anomalous device.

A device being monitored by an anomalous device may have no anomaly. The first reliability level may therefore be determined to be higher than the second reliability level to allow more accurate determination of the reliability levels of monitoring logs. Thus, for example, the reliability levels can be used to analyze monitoring logs to obtain a multifaceted analysis result. The reliability levels can also be used to extract monitoring logs to be analyzed, thereby potentially reducing the processing load associated with the monitoring log analysis.

The information output device according to a fourth aspect of the present disclosure is the information output device according to any one of aspects 1 to 3. In the information output device according to the fourth aspect, the determiner calculates a degree of anomaly of each of the one or more devices indicated by the first transmission path and, based on a sum of one or more degrees of anomaly calculated, determines the reliability level of the received monitoring log.

Thus, the reliability level of a monitoring log can be determined based on the states of anomaly occurrence in all the devices through which the monitoring log has passed.

The information output device according to a fifth aspect of the present disclosure is the information output device according to any one of aspects 1 to 4. In the information output device according to the fifth aspect, the manager determines whether a predetermined reset condition is satisfied and, if the reset condition is determined to be satisfied, updates, to a normal state, the state of anomaly occurrence in each of one or more specific devices specified by the reset condition among one or more devices indicated as not normal by the first state.

Thus, if, for example, a monitoring device is updated to operate normally, the state of anomaly occurrence in each of the one or more specific devices can be updated to a normal state. In this manner, the reliability levels of monitoring logs can still be accurately determined after a device returns to normal operation.

The information output device according to a sixth aspect of the present disclosure is the information output device according to any one of aspects 1 to 5. In the information output device according to the sixth aspect, the monitoring information further includes reliability level information indicating the reliability level.

Thus, a device receiving the monitoring information can refer to the reliability level information to determine whether the monitoring log included in the received monitoring information is reliable.

The information output device according to a seventh aspect of the present disclosure is the information output device according to the sixth aspect. In the information output device according to the seventh aspect, the reliability level information is information indicating whether the monitoring log included in the monitoring information is reliable.

The information output device according to an eighth aspect of the present disclosure is the information output device according to the seventh aspect. In the information output device according to the eighth aspect, as the reliability level information, the monitoring log in the monitoring information is invalidated to indicate that the monitoring log is unreliable.

The information output device according to a ninth aspect of the present disclosure is the information output device according to the sixth aspect. In the information output device according to the ninth aspect, the reliability level indicated by the reliability level information is represented as a numerical value, with larger values indicating higher reliability.

The information output device according to a tenth aspect of the present disclosure is the information output device according to any one of aspects 1 to 9. In the information output device according to the tenth aspect, the outputter determines whether the monitoring log is reliable based on the reliability level and, if the monitoring log is unreliable, avoids outputting the monitoring information.

Thus, a device receiving monitoring logs can determine that all the received monitoring logs are reliable.

The information output device according to an eleventh aspect of the present disclosure is the information output device according to any one of aspects 1 to 10. In the information output device according to the eleventh aspect, the outputter determines whether the monitoring log is reliable based on the reliability level and, if the monitoring log is unreliable, outputs the monitoring information to an accumulation device that accumulates a history of the state of anomaly occurrence.

Thus, monitoring information including unreliable monitoring logs can be accumulated in the accumulation device.

An information output method according to a twelfth aspect of the present disclosure is the information output method that includes: receiving monitoring logs generated by a plurality of monitoring devices including a first monitoring device and a second monitoring device; and outputting monitoring information including the monitoring logs, the second monitoring device monitoring the first monitoring device and having security privilege higher than security privilege of the first monitoring device. The information output method according to the twelfth aspect includes: sequentially receiving monitoring logs, each monitoring log including: device information indicating one monitoring device of the plurality of monitoring devices; and a monitoring result indicating whether a monitoring target of the one monitoring device has an anomaly; managing a first state based on the monitoring result included in each monitoring log sequentially received, the first state being a state of anomaly occurrence in the monitoring target of each of the plurality of monitoring devices; obtaining path information indicating transmission paths, each transmission path having a different one of the plurality of monitoring devices as a source of a monitoring log, each transmission path being indicated by one or more devices through which a monitoring log transmitted by the source passes; identifying, based on a first transmission path in the path information corresponding to the monitoring target of the monitoring device indicated by the device information included in the received monitoring log, and based on the first state, a second state that is a state of anomaly occurrence in a monitoring target of each of the one or more monitoring devices indicated by the first transmission path; determining, based on the identified second state, a reliability level of the received monitoring log; and outputting, based on the reliability level, monitoring information including the monitoring log.

Thus, the reliability level of a monitoring log is determined based on the second state, which is the state of anomaly occurrence in each of the one or more devices indicated by the transmission path. For example, if any of the one or more devices through which a monitoring log has passed has an anomaly, the reliability level may be determined to indicate low reliability of the monitoring log. In this manner, the monitoring information can be output that enables a device receiving a log to readily determine whether the log is reliable.

A program according to a thirteenth aspect of the present disclosure is the program for causing a computer to execute the information output method according to aspect 12.

Hereinafter, the specific example of a monitoring system according to one aspect of the present disclosure is described with reference to the drawings. The embodiment described here is one specific example of the present disclosure. Accordingly, the numerical values, shapes, structural elements, the arrangement and connection form of the structural elements, steps, the processing order of the steps, etc. shown in the following embodiment are mere examples, and thus are not intended to limit the present disclosure. Among the structural elements described in the following embodiment, structural elements not recited in any one of the independent claims are optional.

Embodiment

General Configuration Diagram of a Monitoring System

FIG. 1 is a diagram illustrating the general configuration of a monitoring system in an embodiment.

The monitoring system includes monitoring server 10 and in-vehicle system 20. Monitoring server 10 and in-vehicle system 20 are interconnected over external network 30.

External network 30 is the Internet, for example. External network 30 may implement wired or wireless communication. The wireless communication may be based on any one or combination of existing technologies, such as Wi-Fi (R), 3G/Long Term Evolution (LTE), Bluetooth (R), and V2X communications.

Monitoring server 10 is a device that obtains a monitoring result from in-vehicle system 20 as information on the security state of in-vehicle system 20, and displays the monitoring result using a graphical user interface or analyzes the monitoring result. For example, monitoring server 10 is used by a security analyst at an SOC to check the monitoring result and, for any anomaly in in-vehicle system 20, consider countermeasures such as program update.

In-vehicle system 20 is a device that performs operations such as communication control, vehicle control, and video output, as well as monitors the security state of in-vehicle system 20 to notify monitoring server 10 of the result of monitoring the security state. Although FIG. 1 shows only one in-vehicle system 20, one or more in-vehicle systems 20 each transmit the result of monitoring the security state to monitoring server 10. Details of in-vehicle system 20 will be described below.

Configurations of Monitoring Server 10 and In-Vehicle System 20

Figure 2:
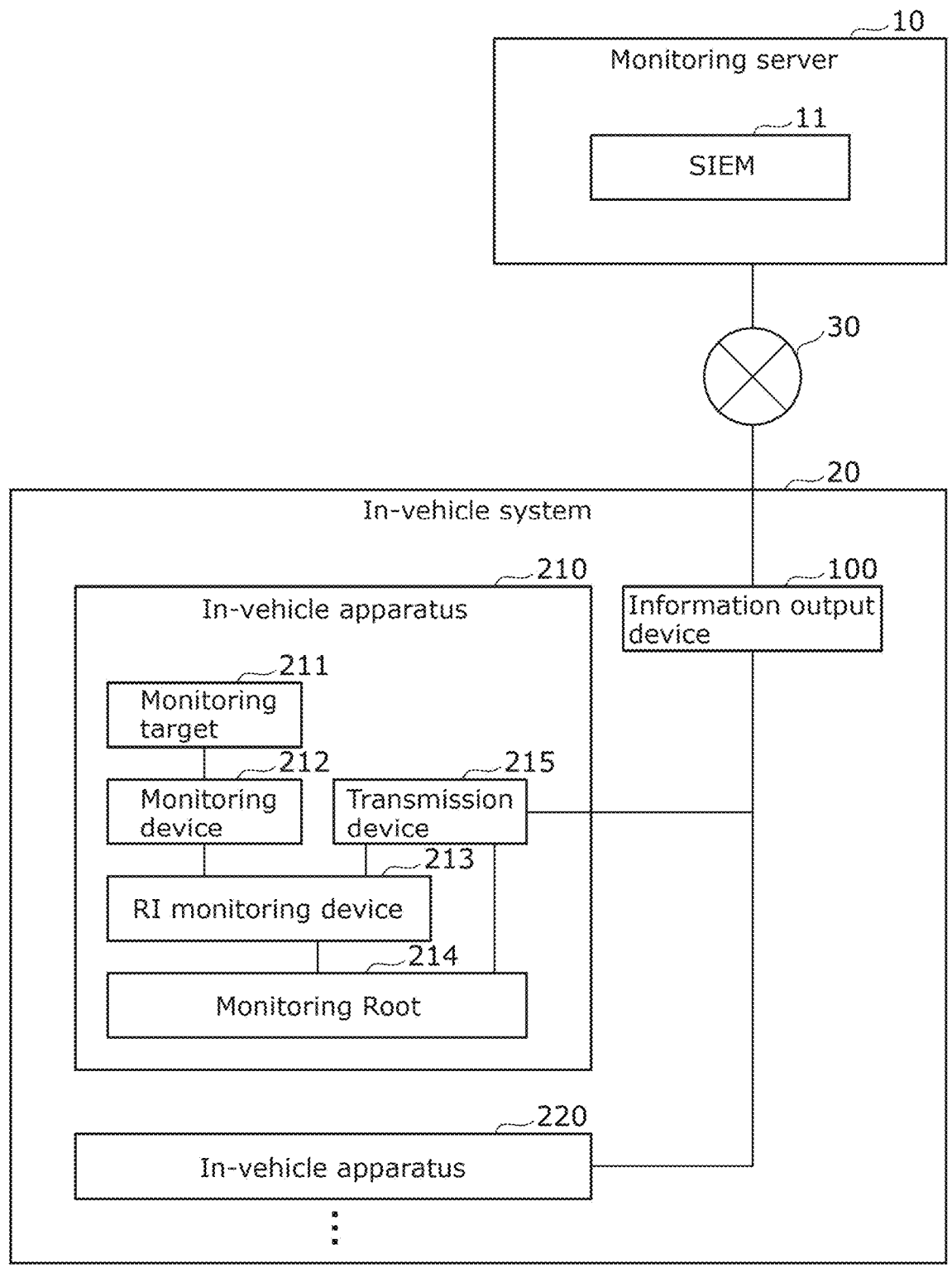
FIG. 2 is a diagram illustrating the configurations of the monitoring server and the in-vehicle system in the embodiment.

FIG. 2 is a diagram illustrating the configurations of the monitoring server and the in-vehicle system in the embodiment.

Monitoring server 10 includes Security Information and Event Management (SIEM) 11. SIEM 11 is an integrated monitoring system that collects logs or data that are output from multiple systems and analyzes or visualizes the logs or data, thereby monitoring a network and detecting incidents such as cyberattacks and malware infection.

In-vehicle system 20 includes in-vehicle apparatuses 210 and 220 and information output device 100. In-vehicle system 20 may include further in-vehicle apparatuses in addition to in-vehicle apparatuses 210 and 220.

In-vehicle apparatus 210 includes monitoring target 211, monitoring device 212, runtime integrity (RI) monitoring device 213, monitoring Root 214, and transmission device 215. It is to be noted that monitoring target 211, monitoring device 212, RI monitoring device 213, monitoring Root 214, and transmission device 215 may be referred to as multiple devices.

Monitoring target 211 is implemented by an application, and the integrity of the application is monitored by monitoring device 212. Monitoring device 212 may also monitor the operation or communication of the application of monitoring target 211. Examples of the application of monitoring target 211 include an external communication app, a control app, and a video app. The external communication app communicates with monitoring server 10 over external network 30. The control app controls operations related to the running of the vehicle having in-vehicle system 20. The video app obtains video, such as video taken by a camera, and outputs the video to an infotainment system, an instrument panel, or a head-up display.

Monitoring device 212 monitors monitoring target 211. Specifically, monitoring device 212 verifies the integrity of the program of the application implementing monitoring target 211 to monitor for any anomaly in monitoring target 211. Monitoring device 212 may also monitor communication data sent and received by the application implementing monitoring target 211, or monitor a memory or files accessed by the application. Monitoring device 212 transmits monitoring logs including monitoring results to transmission device 215 via RI monitoring device 213.

For example, monitoring device 212 reads data in a storage area of a storage device that stores the program implementing monitoring target 211, and performs a predetermined operation on the data to generate a verification value. Monitoring device 212 compares the verification value with an expected value stored in the storage device to verify the integrity of the program of monitoring target 211. If the verification value matches the expected value, monitoring device 212 determines that monitoring target 211 is normal; otherwise, monitoring device 212 determines that monitoring target 211 is anomalous.

The expected value is generated by performing a predetermined operation on the data of the program implementing monitoring target 211, when the program is in a normal state free from attacks. For example, the expected value may be generated when the program is created or when the program is launched for the first time. The expected value may be generated from part of the normal data of the program implementing monitoring target 211, from configuration data referred to by the program or from part of the configuration data, or from a combination of the above.

The predetermined operation may be, for example, a hash operation for calculating a hash value. The expected value may be a hash value obtained by performing the hash operation on the normal program. The verification value may be a hash value obtained at the time of verification by performing the hash operation on the data in the storage area that stores the program of monitoring target 211. The predetermined operation is not limited to a hash operation, but may be any reproducible operation that converts a first value to its corresponding unique second value.

Monitoring device 212 may be implemented by a virtual machine, for example. Alternatively, monitoring device 212 may be implemented as a program operating in the same execution environment as monitoring target 211, or in the kernel space in that execution environment. Monitoring device 212 is an example of one of multiple monitoring devices.

RI monitoring device 213 monitors monitoring device 212 and transmission device 215. Specifically, RI monitoring device 213 verifies the integrity of the program implementing monitoring device 212 to monitor for any anomaly in monitoring device 212. RI monitoring device 213 verifies the integrity of the program implementing transmission device 215 to monitor for any anomaly in transmission device 215. RI monitoring device 213 transmits monitoring logs including monitoring results to transmission device 215.

RI monitoring device 213 verifies the integrity in the same manner as monitoring device 212. That is, the integrity verification by RI monitoring device 213 can be described as in the description of the integrity verification by monitoring device 212, except that RI monitoring device 213 replaces monitoring device 212 as the verifier, and monitoring device 212 or transmission device 215 replaces monitoring target 211 as the verified object.

RI monitoring device 213 may be implemented by a virtual machine different from monitoring device 212 and/or transmission device 215, or may be implemented as a program that operates in the same execution environment as monitoring device 212 and/or transmission device 215 or in the kernel space in that execution environment. RI monitoring device 213 is an example of one of the multiple monitoring devices, and is an example of a monitoring device having security privilege higher than the security privilege of monitoring device 212.

Monitoring Root 214 monitors RI monitoring device 213. Specifically, monitoring Root 214 verifies the integrity of the program implementing RI monitoring device 213 to monitor for any anomaly in RI monitoring device 213. Monitoring Root 214 transmits monitoring logs including monitoring results to transmission device 215.

Monitoring Root 214 verifies the integrity in the same manner as monitoring device 212. That is, the integrity verification by monitoring Root 214 can be described as in the description of the integrity verification by monitoring device 212, except that monitoring Root 214 replaces monitoring device 212 as the verifier, and RI monitoring device 213 replaces monitoring target 211 as the verified object.

For example, monitoring Root 214 operates on a trusted operating system implemented to be vulnerability-free. Furthermore, because the operating system software is verified upon system startup from a root of trust (ROT), which is trusted hardware, monitoring Root 214 is considered the most trusted among applications, virtual machines, and hypervisors. Monitoring Root 214 is implemented using, for example, control in an execution environment called a trusted execution environment (TEE). Monitoring Root 214 may also be implemented by a TrustZone mechanism, which is a standard function of the Cortex-A family of ARM-based central processing units (CPUs). Monitoring Root 214 may also be implemented by the Secure Enclave Processor (SEP) of Apple Inc., or Titan M of Google LLC. Monitoring Root 214 is an example of one of the multiple monitoring devices, and is an example of a monitoring device having security privilege higher than the security privilege of RI monitoring device 213. Monitoring Root 214 is the monitoring device having the highest security privilege among the multiple monitoring devices. Alternatively, monitoring Root 214 may be a program operating in the kernel space in the same execution environment as RI monitoring device 213 and having a trust level enhanced by tamper-resistant implementation.

Transmission device 215 transmits the monitoring logs received from monitoring device 212, RI monitoring device 213, and monitoring root 214 to information output device 100. Transmission device 215 may be implemented by a virtual machine, for example. Alternatively, transmission device 215 may be implemented as a program that operates in the same execution environment as monitoring target 211, monitoring device 212, and/or RI monitoring device 213.

In-vehicle apparatus 210 includes multiple monitoring devices, which are monitoring device 212, RI monitoring device 213, and monitoring Root 214 as described above.

As with in-vehicle apparatus 210, in-vehicle apparatus 220 includes multiple monitoring devices with different levels of security privilege. As in in-vehicle apparatus 210, the multiple monitoring devices in in-vehicle apparatus 220 have a configuration (a chain of trust) in which each monitoring device is monitored by a monitoring device having higher security privilege.

Configuration of Information Output Device 100

Figure 3:
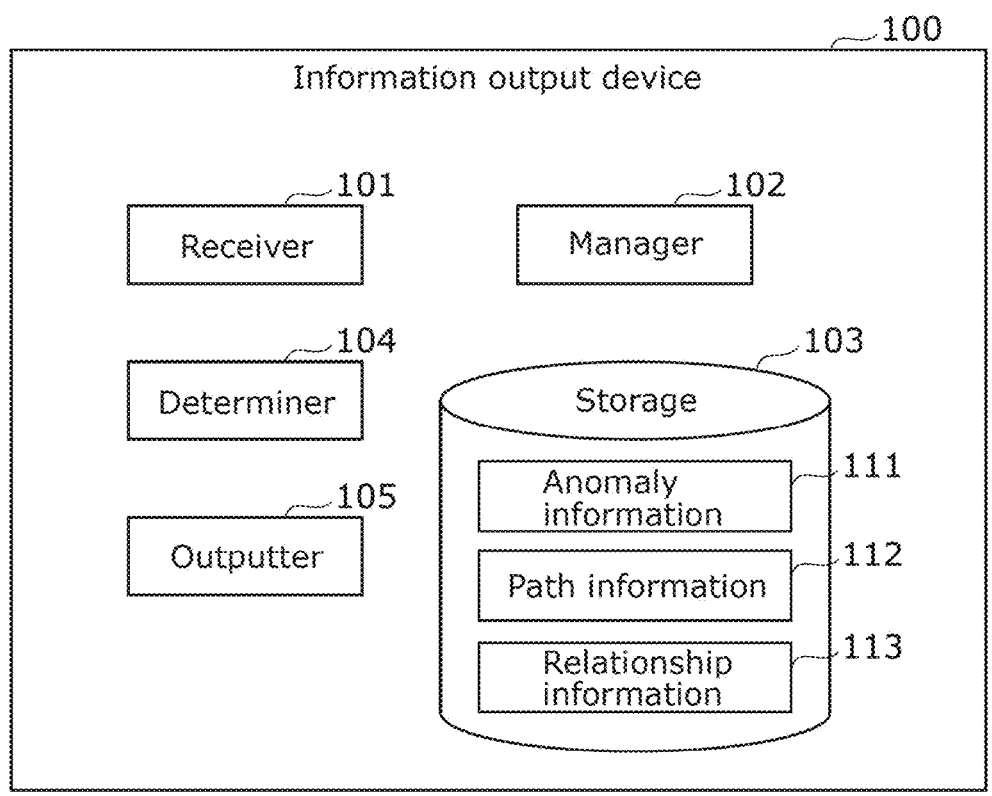
FIG. 3 is a diagram illustrating the configuration of the information output device in the embodiment.

FIG. 3 is a diagram illustrating the configuration of the information output device in the embodiment.

Information output device 100 receives monitoring logs generated by the multiple monitoring devices in in-vehicle apparatuses 210 and 220 and outputs monitoring information including the monitoring logs. Information output device 100 includes receiver 101, manager 102, storage 103, determiner 104, and outputter 105.

Receiver 101 sequentially receives the monitoring logs. Each monitoring log includes device information indicating the monitoring device serving as a monitor (i.e., the monitoring device that monitors an object), and a monitoring result. The monitoring result is information indicating whether the monitoring target of one monitoring device (the monitoring device serving as the monitor) of the multiple monitoring devices has an anomaly. The monitoring result is the result of monitoring by the one monitoring device. The device information is information (e.g., a device ID) identifying the monitoring device that has generated the monitoring log, that is, the monitoring device as the source of the monitoring log. It is to be noted that receiver 101 may have a function of receiving an aggregate monitoring log that includes multiple monitoring logs, taking individual monitoring logs out of the aggregate monitoring log, and outputting the individual monitoring logs to the subsequent processor.

Manager 102 manages, based on the monitoring results included in the sequentially received monitoring logs, anomaly information 111 indicating a first state; the first state is the state of anomaly occurrence in the monitoring target of each of the multiple monitoring device. Anomaly information 111 is stored in storage 103, and manager 102 performs the processing of causing anomaly information 111 to reflect the monitoring results included in the monitoring logs.

FIG. 4 is a diagram illustrating an example of the anomaly information before monitoring logs are generated. FIG. 5 is a diagram illustrating an example of the anomaly information after a monitoring log is generated.

As illustrated in FIGS. 4 and 5, anomaly information 111 includes information indicated by two items: In-vehicle apparatus and Anomalous device. The item In-vehicle apparatus indicates each in-vehicle apparatus that includes a device having an anomaly. The item Anomalous device indicates each device having an anomaly.

As illustrated in FIG. 4, before monitoring logs are generated, anomaly information 111 is empty with no information because the monitoring target of each of the multiple monitoring devices is operating normally with no anomaly. Thus, anomaly information 111 in the empty state indicates that all the monitoring targets of the multiple monitoring devices are operating normally. Anomaly information 111 containing information on a monitoring device indicates that the monitoring device has an anomaly.

For example, receiver 101 may receive a monitoring log generated by monitoring Root 214 and indicating an anomaly in RI monitoring device 213. Based on this monitoring log, manager 102 causes anomaly information 111 to reflect the anomaly in RI monitoring device 213 in in-vehicle apparatus 210. This results in anomaly information 111 shown in FIG. 5, in which information indicating in-vehicle apparatus 210 is added to the item In-vehicle apparatus, and information indicating RI monitoring device 213 is added to the item Anomalous device.

FIG. 6 is a diagram illustrating another example of the anomaly information after monitoring logs are generated.

Here, in addition to the two items In-vehicle apparatus and Anomalous device, anomaly information 111 further includes information indicated by the item Anomaly state. The item Anomaly state may indicate that a monitoring device has an anomaly, as well as that a monitoring device has low reliability. For example, since a monitoring device having an anomaly performs low-reliability monitoring operations, a device being monitored by that anomalous monitoring device might not be in normal operation. Thus, low reliability may be indicated as the anomaly state of a device being monitored by a monitoring device having an anomaly.

For example, receiver 101 may receive a monitoring log generated by monitoring Root 214 and indicating an anomaly in RI monitoring device 213. Based on this monitoring log, manager 102 causes anomaly information 111 to reflect the anomaly in RI monitoring device 213 in in-vehicle apparatus 210. Along with this, manager 102 may cause anomaly information 111 to reflect the low reliability of the operation of monitoring device 212 and transmission device 215 being monitored by RI monitoring device 213. This results in anomaly information 111 shown in FIG. 6, in which the item Anomaly state indicates that RI monitoring device 213 in in-vehicle apparatus 210 has an anomaly, as well as that monitoring device 212 and transmission device 215 in in-vehicle apparatus 210 have low reliability. It is to be noted that the fact that devices are being monitored by an anomalous monitoring device is identified based on relationship information 113 to be described below. It is also to be noted that devices being monitored by a monitoring device include monitoring targets being monitored directly by the monitoring device, as well as monitoring targets being monitored further by the directly monitored monitoring targets. In other words, devices being monitored by a monitoring device include all of the one or more devices at the levels lower than the monitoring device in the monitoring chain.

Manager 102 also determines whether a predetermined reset condition is satisfied. If manager 102 determines that the reset condition is satisfied, manager 102 may update the state of anomaly occurrence in one or more specific devices indicated by the reset condition to a normal state, among one or more devices indicated as not normal by the first state in anomaly information 111. The reset condition may have its associated one or more specific devices to be reset (updated to a normal state). If the reset condition is satisfied, the state of anomaly occurrence in all the one or more specific devices associated with the reset condition is updated to a normal state. The one or more specific devices may be all the monitoring targets of the multiple monitoring devices in in-vehicle apparatuses 210 and 220, or may be one or some of all the monitoring targets of the multiple monitoring devices. The reset condition may be receiving a reset request from an external device, updating a program through a specific function (e.g., over the air (OTA)), a lapse of a predetermined time period, or turning off the ignition in the vehicle having in-vehicle system 20.

Storage 103 stores anomaly information 111, path information 112, and relationship information 113. Anomaly information 111 has been described above, and the following describes path information 112 and relationship information 113.

FIG. 7 is a diagram illustrating an example of the path information in the embodiment.

Path information 112 indicates transmission paths, each having a different one of the multiple monitoring devices as the source of monitoring logs. Each transmission path is indicated by one or more devices, among the multiple devices, through which monitoring logs transmitted from the source pass.

For example, as illustrated in FIG. 7, path information 112 includes information indicated by two items: Source and Transmission path. The item Source indicates each monitoring device that transmits monitoring logs, that is, each monitoring device that generates monitoring logs. The item Transmission path indicates devices through which monitoring logs from each source pass to transmission device 215.

As an example, the transmission path of monitoring logs having monitoring device 212 as the source device is indicated by monitoring device 212, RI monitoring device 213, and transmission device 215. As another example, the transmission path of monitoring logs having RI monitoring device 213 as the source device is indicated by RI monitoring device 213 and transmission device 215. As still another example, the transmission path of monitoring logs having monitoring Root 214 as the source device is indicated by monitoring Root 214 and transmission device 215.

It is to be noted that the transmission path of a monitoring log may depend not only on the source device but on both the source device and the type of the monitoring log.

FIG. 8 is a diagram illustrating an example of the relationship information in the embodiment.

Relationship information 113 indicates monitoring relationships between the multiple devices. Each monitoring relationship indicates a pair of a monitor and a monitoring target. That is, each monitoring relationship indicates a monitoring device serving as a monitor, and a monitoring target of the monitoring device serving as the monitor, among the multiple devices. It is to be noted that devices eligible for the monitors are the multiple monitoring devices among the multiple devices, and devices eligible for the monitoring targets are the multiple devices except monitoring Root 214.

For example, as illustrated in FIG. 8, relationship information 113 includes information indicated by four items: In-vehicle apparatus, Monitor, Monitoring target, and Monitored details. The item In-vehicle apparatus indicates each in-vehicle apparatus that include devices of monitors and monitoring targets. The item Monitor indicates each monitoring device that monitors an object. The item Monitoring target indicates each device monitored by a monitoring device serving as a monitor. The item Monitored details indicates the type of each monitoring operation.

The relationship information thus indicates the relationships between the monitors and the monitoring targets, among the multiple devices included in in-vehicle apparatuses 210 and 220.

Determiner 104 identifies a second state based on a first transmission path in path information 112 corresponding to the device information included in a received monitoring log, and based on the first state. The second state is the state of anomaly occurrence in each of the one or more devices indicated by the first transmission path. The second state here indicates whether each of the one or more devices indicated by the first transmission path is anomalous or normal. Based on the identified second state, determiner 104 determines the reliability level of the received monitoring log. Specifically, determiner 104 calculates the degree of anomaly of each of the one or more devices indicated by the first transmission path and, based on the sum of the calculated one or more degrees of anomaly, determines the reliability level of the received monitoring log.

Now, a first example of the reliability level determination by determiner 104 will be described.

The first example relates to a case in which storage 103 stores anomaly information 111 illustrated in FIG. 5, and receiver 101 receives a monitoring log from monitoring device 212. Based on path information 112, determiner 104 identifies the transmission path that has monitoring device 212 as the source. Then, based on anomaly information 111, determiner 104 identifies the state of anomaly occurrence in each of monitoring device 212, RI monitoring device 213, and transmission device 215 indicated by the identified transmission path. In this case, determiner 104 can determine that only RI monitoring device 213 is anomalous in anomaly information 111 in FIG. 5. Therefore, determiner 104 can determine, as the second state, that monitoring device 212 is normal, RI monitoring device 213 is anomalous, and transmission device 215 is normal. Determiner 104 calculates, for example, the degree of anomaly as 100 for an anomalous device, and 0 for a normal device. Accordingly, the degree of anomaly is calculated as 0 for monitoring device 212, 100 for RI monitoring device 213, and 0 for transmission device 215. Determiner 104 subtracts the sum 100 of the degrees of anomaly of these three devices from the predetermined value 100 to obtain 0 as the reliability level of the monitoring log. The degree of anomaly illustrated here is a numerical value such that larger values indicate higher degrees of anomaly. The level of reliability illustrated here is a numerical value such that larger values indicate higher reliability.

Next, a second example of the reliability level determination by determiner 104 will be described.

In the second example, determiner 104 may perform the processing of identifying the second state in the following manner. Determiner 104 identifies the second state as (i) normal, (ii) anomalous, or (iii) low reliability (i.e., being monitored by an anomalous device having an anomaly among the multiple devices), based on the first transmission path, the first state, and relationship information 113. The second state here indicates whether each of the one or more monitoring devices indicated by the first transmission path is (i) normal, (ii) anomalous, or (iii) low in reliability. Based on the identified second state, determiner 104 determines the reliability level of the received monitoring log. Specifically, determiner 104 calculates the degree of anomaly of each of the one or more monitoring devices indicated by the first transmission path and, based on the sum of the calculated one or more degrees of anomaly, determines the reliability level of the received monitoring log.

For example, the following describes a case in which storage 103 stores anomaly information 111 illustrated in FIG. 6, and receiver 101 receives a monitoring log from monitoring Root 214. Based on path information 112, determiner 104 identifies the transmission path that has monitoring Root 214 as the source. Then, based on anomaly information 111, determiner 104 identifies the state of anomaly occurrence in each of monitoring Root 214 and transmission device 215 indicated by the identified transmission path. In this case, determiner 104 can determine that RI monitoring device 213 is anomalous and monitoring device 212 and transmission device 215 have low reliability in anomaly information 111 in FIG. 6. Therefore, as the second state representing the state of anomaly occurrence in each of monitoring Root 214 and transmission device 215 indicated by the identified transmission path, determiner 104 can determine that monitoring Root 214 is normal and transmission device 215 has low reliability. Determiner 104 calculates, for example, the degree of anomaly as 30 for a low-reliability device, and 0 for a normal device. Accordingly, the degree of anomaly is calculated as 0 for monitoring Root 214, and 30 for transmission device 215. Determiner 104 subtracts the sum 30 of the degrees of anomaly of these two devices from the predetermined value 100 to obtain 70 as the reliability level of the monitoring log.

In the reliability level determination in the above second example, a first reliability level of a first monitoring log that has passed through a monitoring device being monitored by an anomalous device may be determined to be higher than a second reliability level of a second monitoring log that has passed through an anomalous device. For example, a first degree of anomaly of a low-reliability device and a second degree of anomaly of an anomalous device may be calculated so that the first degree of anomaly is lower than the second degree of anomaly. Then, the first reliability level obtained by subtracting the first degree of anomaly from the predetermined value will be higher than the second reliability level obtained by subtracting the second degree of anomaly from the predetermined value. The reliability level may be represented as, for example, a numerical value, such that larger values may indicate higher reliability or smaller values may indicate higher reliability.

Outputter 105 outputs, based on the determined reliability level, monitoring information including the monitoring log. Specifically, outputter 105 may generate monitoring information, including the monitoring log and reliability level information indicating the reliability level, and output the generated monitoring information to monitoring server 10 over external network 30. That is, the monitoring information here includes the reliability level information.

FIG. 9 is a diagram illustrating an example of the format of a monitoring log in the embodiment. FIG. 10 is a diagram illustrating an example of the format of monitoring information in the embodiment.

As illustrated in FIG. 9, a monitoring log includes: destination information (e.g., the IP address or device ID of the destination device) indicating the destination device; source information (e.g., the IP address or device ID of the source device) indicating the source device; a timestamp indicating the time of generation of the monitoring log; an anomaly detection ID for identifying the description of the anomaly detection (e.g., anomalous RI, memory access error, file access error, or normal Keep Alive); and an anomaly detection detail log indicating data on the details of the anomaly detection (e.g., an anomalous process ID, resource ID, or memory address). The description of the anomaly detection, and the data on the details of the anomaly detection, are information indicating the monitoring result. The monitoring result may include information indicating the monitoring target. It is to be noted that the monitoring log may include, as the monitoring result, information that the monitoring target device is normal with no anomaly observed. In that case, notification of the normal monitoring target may be provided using the anomaly detection ID or the anomaly detection detail log that indicates a normal state.

As illustrated in FIG. 10, in addition to the above information items in a monitoring log, monitoring information further includes reliability level information indicating the reliability level. The reliability level information may be a binary value indicating whether the monitoring log is reliable, or a numerical value such that larger values indicate higher reliability as described above.

If the reliability level of the monitoring log is higher than or equal to a predetermined threshold (e.g., 50), outputter 105 may determine that the monitoring log is reliable; otherwise, outputter 105 may determine that the monitoring log is unreliable.

If outputter 105 determines that the monitoring log is reliable, outputter 105 may generate the monitoring information by assigning, to the monitoring log, reliability level information that is a value (e.g., 0) indicating that the monitoring log is reliable. Conversely, if outputter 105 determines that the monitoring log is unreliable, outputter 105 may generate the monitoring information by assigning, to the monitoring log, reliability level information that is a value (e.g., 1) indicating that the monitoring log is unreliable. Outputter 105 may transmit the generated monitoring information to monitoring server 10.

Alternatively, if outputter 105 determines that the monitoring log is unreliable, outputter 105 may generate the monitoring information by invalidating (e.g., masking) the monitoring log, indicating that the monitoring log is unreliable; this serves as the reliability level information included in the monitoring information. Conversely, if outputter 105 determines that the monitoring log is reliable, outputter 105 may generate the monitoring information by not invalidating (e.g., not masking) the monitoring log, indicating that the monitoring log is reliable; this serves as the reliability level information included in the monitoring information. Outputter 105 may transmit the generated monitoring information to monitoring server 10.

Alternatively, if outputter 105 determines that the monitoring log is unreliable, outputter 105 may output (transmit) the monitoring information including the unreliable monitoring log to an accumulation device that accumulates the history of the state of anomaly occurrence. The accumulation device (not shown) is connected to external network 30.

Alternatively, if outputter 105 determines that the monitoring log is unreliable, outputter 105 may avoid outputting the monitoring information.

Operations of Information Output Device 100

Figure 11:
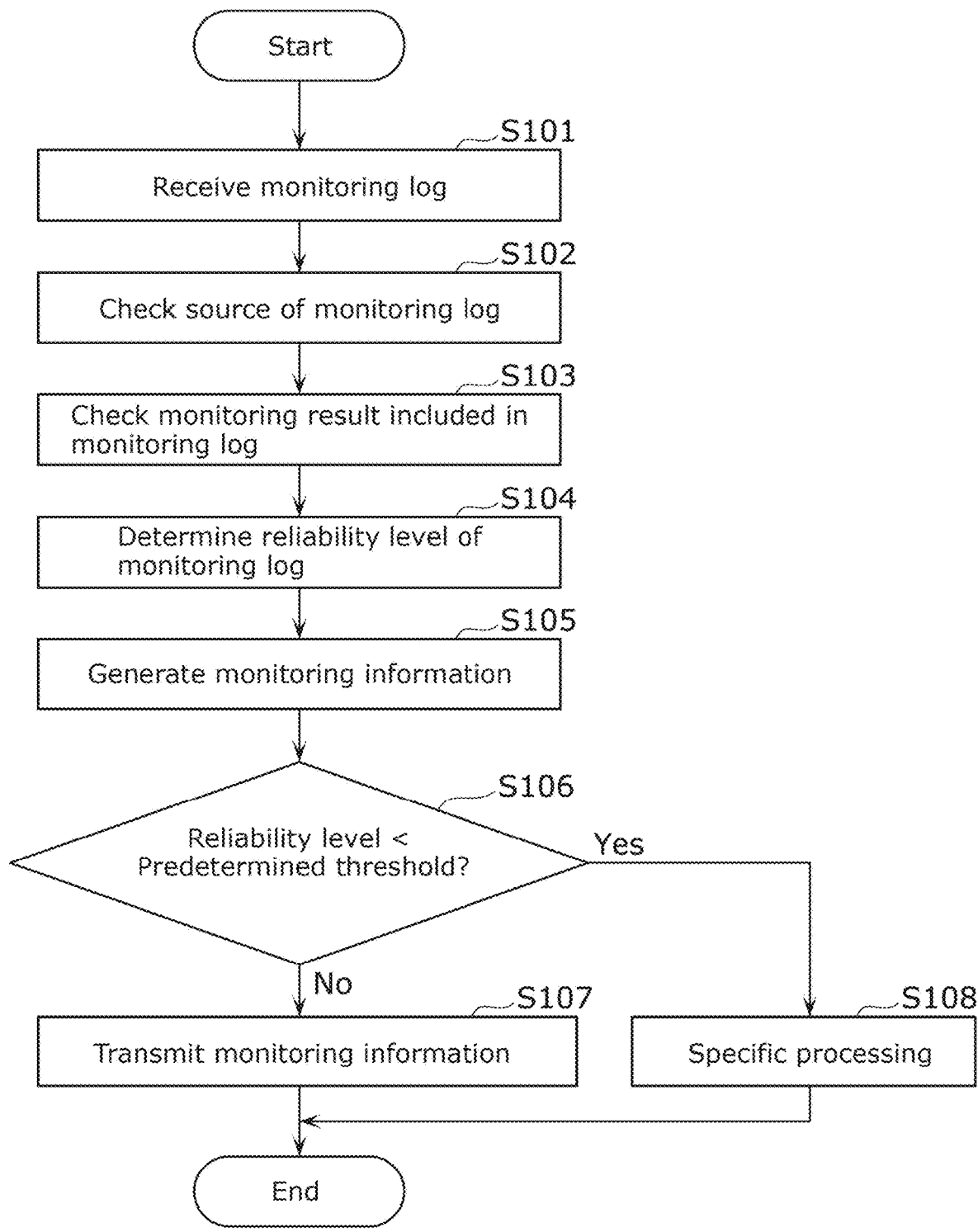
FIG. 11 is a flowchart illustrating an example of operations of the information output device in the embodiment.

FIG. 11 is a flowchart illustrating an example of operations of the information output device in the embodiment.

Information output device 100 sequentially receives monitoring logs generated in in-vehicle apparatuses 210 and 220 and calculates the reliability level of each received monitoring log. Based on the calculated reliability level, information output device 100 outputs monitoring information including the monitoring log. In in-vehicle apparatuses 210 and 220, the monitoring logs may be output one by one to information output device 100 upon each monitoring log generation, or the monitoring logs may be accumulated until a predetermined time and then output to information output device 100.

The operations of information output device 100 shown in FIG. 11 illustrate processing for one received monitoring log. Information output device 100 repeats the operations in FIG. 11 for each received monitoring log upon every monitoring log reception.

Information output device 100 receives a monitoring log (S101). The monitoring log includes device information indicating the monitoring device serving as a monitor (i.e., the monitoring device that monitors an object), and a monitoring result.

Information output device 100 checks the source of the monitoring log, included in the monitoring log (S102).

Information output device 100 checks the monitoring result included in the monitoring log (S103). Specifically, based on the monitoring result, information output device 100 identifies a monitoring target having an anomaly and updates anomaly information 111 to change the anomaly state of the anomalous monitoring target to an anomalous state. If the monitoring result indicates no anomaly, anomaly information 111 is not updated. A specific example of the processing at step S103 has been described as the processing by manager 102.

Information output device 100 determines the reliability level of the monitoring log based on anomaly information 111, path information 112, and relationship information 113 (S104). A specific example of the processing at step S104 has been described as the processing by determiner 104.

Information output device 100 generates monitoring information, which includes the monitoring log and reliability level information indicating the reliability level (S105).

Information output device 100 determines whether the reliability level indicated by the reliability level information included in the monitoring information is lower than a predetermined threshold (S106).

If the reliability level is higher than or equal to the predetermined threshold (No at S106), information output device 100 transmits the monitoring information generated at step S105 to monitoring server 10 (S107).

If the reliability level is lower than the predetermined threshold (Yes at S106), information output device 100 performs specific processing (S108). For example, the specific processing is the processing described as being performed for a monitoring log determined to be unreliable in the description of outputter 105.

A specific example of the processing at steps S105 to S108 has been described as the processing by outputter 105.

Figure 12:
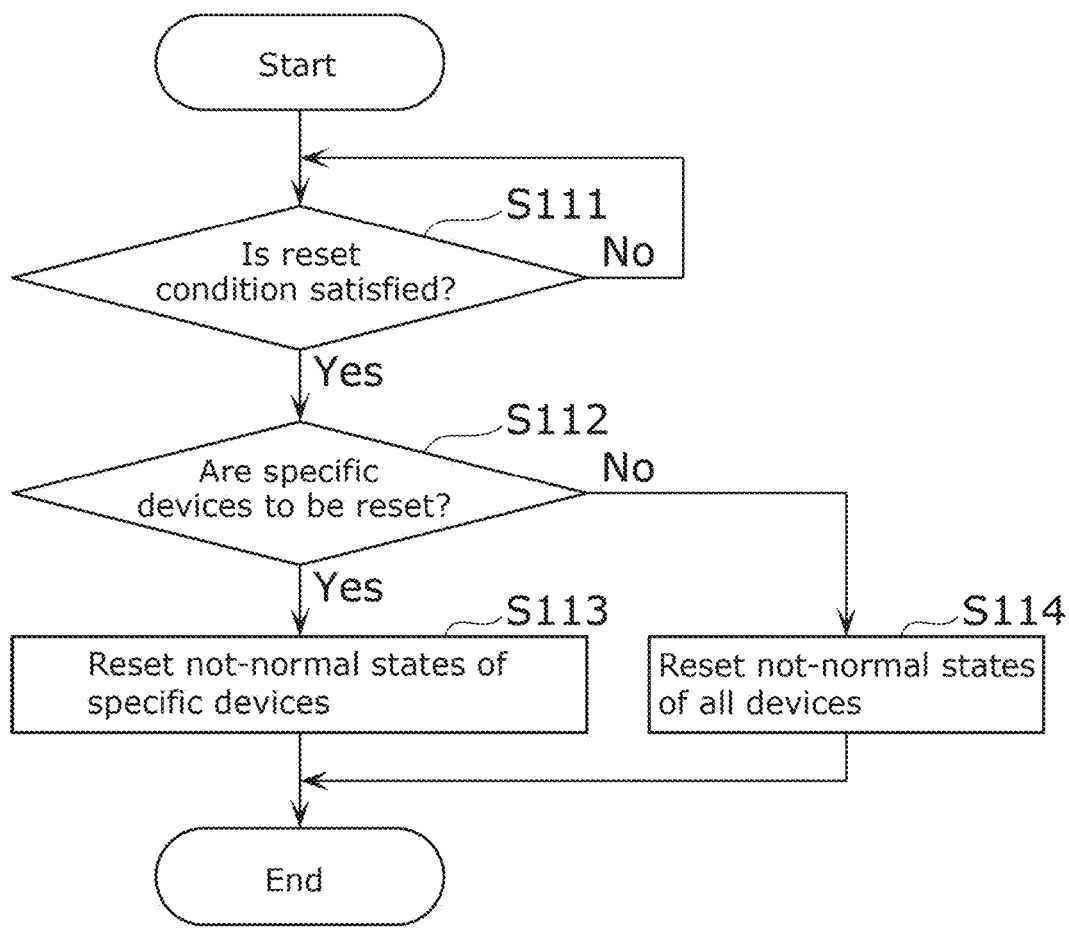
FIG. 12 is a flowchart illustrating an example of a reset operation of the information output device in the embodiment.

FIG. 12 is a flowchart illustrating an example of a reset operation of the information output device in the embodiment. The reset operation returns the anomaly state of devices recorded as anomalous or low reliability in anomaly information 111 to a normal state.

Information output device 100 determines whether a predetermined reset condition is satisfied (S111).

If information output device 100 determines that the reset condition is satisfied (Yes at S111), information output device 100 determines whether the reset condition specifies one or more specific devices to be reset (S112). That is, step S112 involves determining whether the reset condition specifies one or some specific devices, rather than all of the multiple devices, to be reset.

If information output device 100 determines that the reset condition is not satisfied (No at S111), the process returns to step S111.

If information output device 100 determines that one or more specific devices are to be reset (Yes at S112), information output device 100 takes the one or more specific devices specified by the reset condition, among the one or more devices indicated as being not normal by the first state in anomaly information 111. Information output device 100 resets and updates the not-normal state in the state of anomaly occurrence of each of these specific devices to a normal state (S113).

If information output device 100 determines that not one or more specific devices are to be reset (No at S112), that is, all of the multiple devices are to be reset, information output device 100 takes all the devices indicated as not normal by the first state in anomaly information 111. Information output device 100 resets and updates the not-normal state in the state of anomaly occurrence of each of these devices to a normal state (S114).

Advantageous Effects and Other Features

Information output device 100 according to the embodiment receives monitoring logs generated by multiple monitoring devices including a first monitoring device and a second monitoring device monitoring the first monitoring device and having security privilege higher than security privilege of the first monitoring device, and outputs monitoring information including the monitoring logs. Information output device 100 includes receiver 101, manager 102, storage 103, determiner 104, and outputter 105. Receiver 101 sequentially receives monitoring logs, each monitoring log including: device information indicating one monitoring device of the multiple monitoring devices; and a monitoring result indicating whether a monitoring target of the one monitoring device has an anomaly. Manager 102 manages a first state based on the monitoring result included in each monitoring log sequentially received, the first state being a state of anomaly occurrence in the monitoring target of the one monitoring device of the multiple monitoring devices. Storage 103 stores path information 112 indicating transmission paths, each transmission path having a different one of the multiple monitoring devices as a source of a monitoring log, each transmission path being indicated by one or more devices through which a monitoring log transmitted by the source passes. Determiner 104 identifies, based on a first transmission path in path information 112 corresponding to the monitoring target of the monitoring device indicated by the device information included in the received monitoring log, and based on the first state, a second state that is a state of anomaly occurrence in a monitoring target of each of the one or more monitoring devices indicated by the first transmission path, and determines, based on the identified second state, a reliability level of the received monitoring log. Outputter 105 outputs, based on the reliability level, monitoring information including the monitoring log.

Thus, the reliability level of a monitoring log is determined based on the second state, which is the state of anomaly occurrence in each of the one or more devices indicated by the transmission path. For example, if any of the one or more devices through which a monitoring log has passed has an anomaly, the reliability level may be determined to indicate low reliability of the monitoring log. In this manner, the monitoring information can be output that enables a device receiving a log to readily determine whether the log is reliable.

In information output device 100 according to the embodiment, multiple devices including the multiple monitoring devices constitute multiple monitoring relationships. Each of the multiple monitoring relationships indicates a pair of a monitor and a monitoring target. Storage 103 stores relationship information 113 indicating the multiple monitoring relationships. Based on the first transmission path, the first state, and the relationship information, determiner 104 identifies the second state as (i) normal, (ii) anomalous, or (iii) being monitored by an anomalous device having an anomaly among the multiple devices.

Thus, the reliability level of a monitoring log is determined based on the second state identified as (i) normal, (ii) anomalous, or (iii) being monitored by an anomalous device. For example, if any of the one or more devices through which a monitoring log has passed has an anomaly or is being monitored by an anomalous device, the reliability level may be determined to indicate low reliability of the monitoring log. In this manner, the monitoring information can be output that enables a device receiving a log to readily determine whether the log is reliable.

Figure 13:
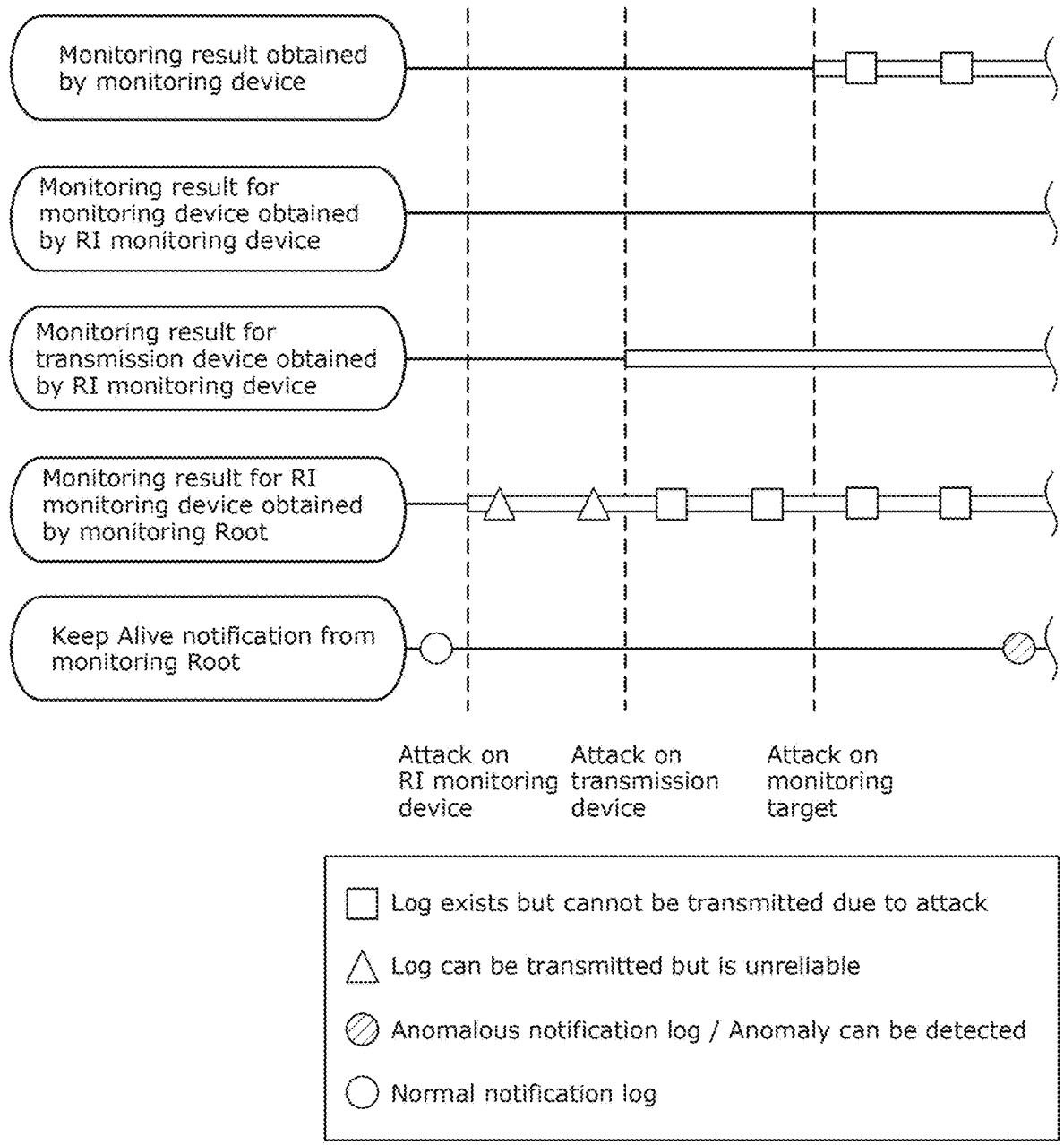
FIG. 13 is a diagram for describing the states of monitoring results in an in-vehicle system being attacked.

This will specifically be described with reference to FIG. 13. FIG. 13 is a diagram for describing the states of monitoring results in an in-vehicle system being attacked. This example assumes that RI monitoring device 213, transmission device 215, and monitoring target 211 are sequentially attacked in this order. State transitions will be described for the following: monitoring results obtained by monitoring device 212; monitoring results for monitoring device 212 obtained by the RI monitoring device 213; monitoring results for transmission device 215 obtained by RI monitoring device 213; monitoring results for RI monitoring device 213 obtained by monitoring Root 214; and Keep Alive notifications from monitoring Root 214. The squares, triangles, diagonally hatched circle, and open circle in FIG. 13 each indicate the time point at which a monitoring log including the corresponding monitoring result or notification is generated. The abscissa in FIG. 13 indicates time. The open rectangles on the lines of the monitoring results obtained by monitoring device 212, the monitoring results for transmission device 215 obtained by RI monitoring device 213, and the monitoring results for RI monitoring device 213 obtained by monitoring Root 214 each indicate that the corresponding monitoring target is being attacked and has an anomaly.

An attack on RI monitoring device 213 causes the state of anomaly occurrence in RI monitoring device 213 to be anomalous. This causes the state of anomaly occurrence in monitoring device 212 and transmission device 215, which are being monitored by RI monitoring device 213, to be low reliability. Because the monitoring logs including the monitoring results for RI monitoring device 213 obtained by monitoring Root 214 pass through transmission device 215, it can be determined that these monitoring logs can be transmitted but is unreliable, as indicated by the triangles.

An attack on transmission device 215 causes an anomaly in transmission device 215 outputting monitoring logs to information output device 100. It can therefore be determined that the monitoring logs generated after the attack cannot be transmitted due to the attack, as indicated by the squares.

In information output device 100 according to the embodiment, a first reliability level of a first monitoring log that has passed through a device being monitored by an anomalous device is determined to indicate higher reliability than a second reliability level of a second monitoring log that has passed through an anomalous device.

A device being monitored by an anomalous device may have no anomaly. The first reliability level may therefore be determined to indicate higher reliability than the second reliability level to allow more accurate determination of the reliability levels of monitoring logs. Thus, for example, the reliability levels can be used to analyze monitoring logs to obtain a multifaceted analysis result. The reliability levels can also be used to extract monitoring logs to be analyzed, thereby potentially reducing the processing load associated with the monitoring log analysis.

In information output device 100 according to the embodiment, determiner 104 calculates a degree of anomaly of each of the one or more devices indicated by the first transmission path and, based on a sum of one or more degrees of anomaly calculated, determines the reliability level of the received monitoring log. Thus, the reliability level of a monitoring log can be determined based on the states of anomaly occurrence in all the devices through which the monitoring log has passed.

In information output device 100 according to the embodiment, manager 102 determines whether a predetermined reset condition is satisfied and, if the reset condition is determined to be satisfied, updates, to a normal state, the state of anomaly occurrence in each of one or more specific devices specified by the reset condition among one or more devices indicated as not normal by the first state.

Thus, if, for example, a monitoring device is updated to operate normally, the state of anomaly occurrence in each of the one or more specific devices can be updated to a normal state. In this manner, the reliability levels of monitoring logs can still be accurately determined after a device returns to normal operation.

In information output device 100 according to the embodiment, the monitoring information further includes reliability level information indicating the reliability level. Thus, a device receiving the monitoring information can refer to the reliability level information to determine whether the monitoring log included in the received monitoring information is reliable.

In information output device 100 according to the embodiment, outputter 105 determines whether the monitoring log is reliable based on the reliability level and, if the monitoring log is unreliable, avoids outputting the monitoring information. Thus, a device receiving monitoring logs can determine that all the received monitoring logs are reliable.

In information output device 100 according to the embodiment, outputter 105 determines whether the monitoring log is reliable based on the reliability level and, if the monitoring log is unreliable, outputs the monitoring information to an accumulation device that accumulates a history of the state of anomaly occurrence. Thus, monitoring information including unreliable monitoring logs can be accumulated in the accumulation device.

Variation

Variation 1

The above embodiment has described that information output device 100 is included in in-vehicle system 20. Alternatively, information output device 100 may be included in the monitoring server.

Figure 14:
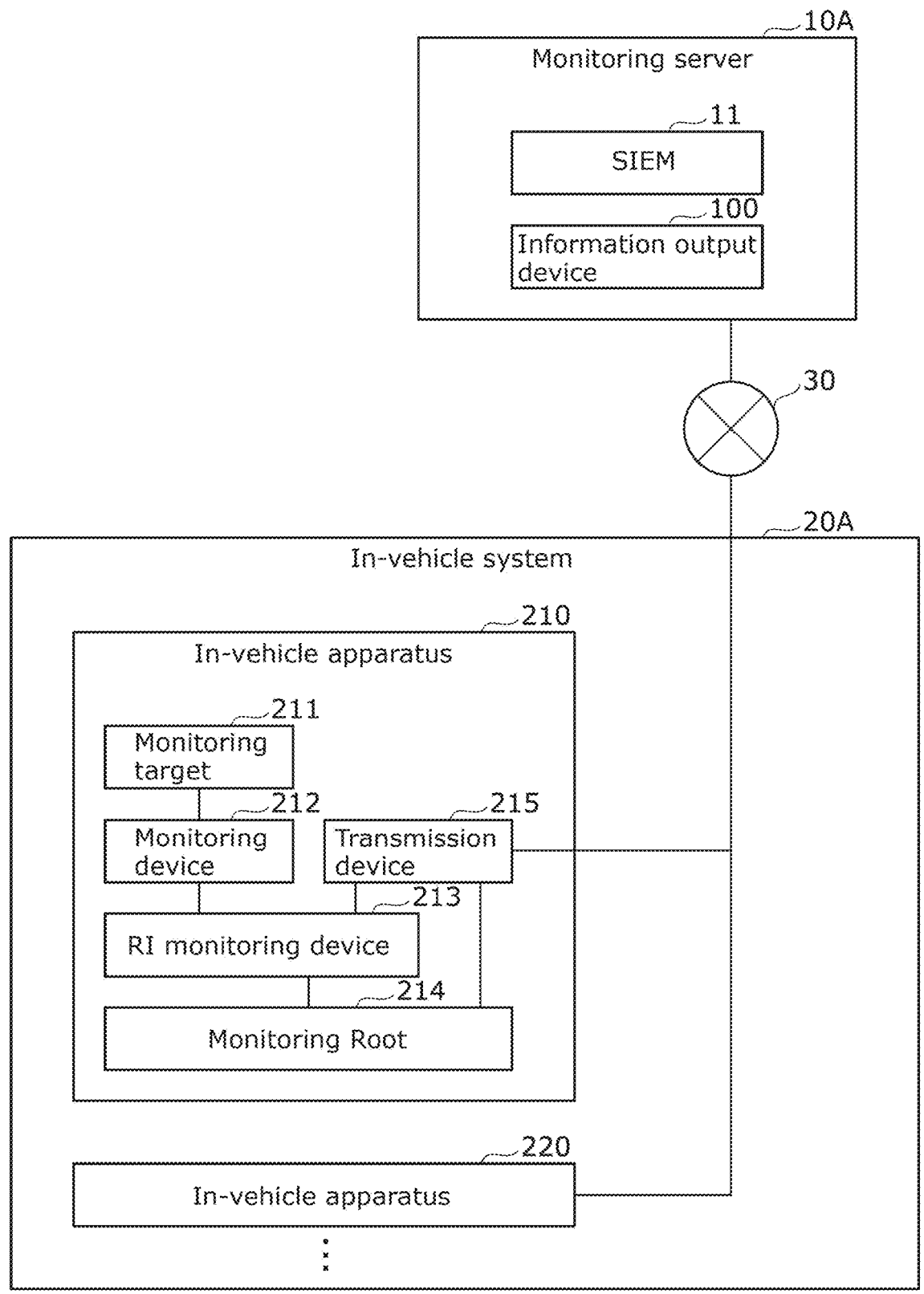
FIG. 14 is a diagram illustrating the configurations of a monitoring server and an in-vehicle system in Variation 1.

FIG. 14 is a diagram illustrating the configurations of a monitoring server and an in-vehicle system in Variation 1.

Monitoring server 10A includes SIEM 11 and information output device 100.

In-vehicle system 20A includes in-vehicle apparatuses 210 and 220 but does not include information output device 100. In-vehicle system 20A transmits monitoring logs generated in in-vehicle apparatuses 210 and 220 to monitoring server 10A over external network 30. Information output device 100 in monitoring server 10A processes the received monitoring logs as in the above embodiment and outputs monitoring information to SIEM 11.

Variation 2

The above embodiment has described that information output device 100 is included in in-vehicle system 20. Alternatively, information output device 100 may be included in the monitoring server.

Figure 15:
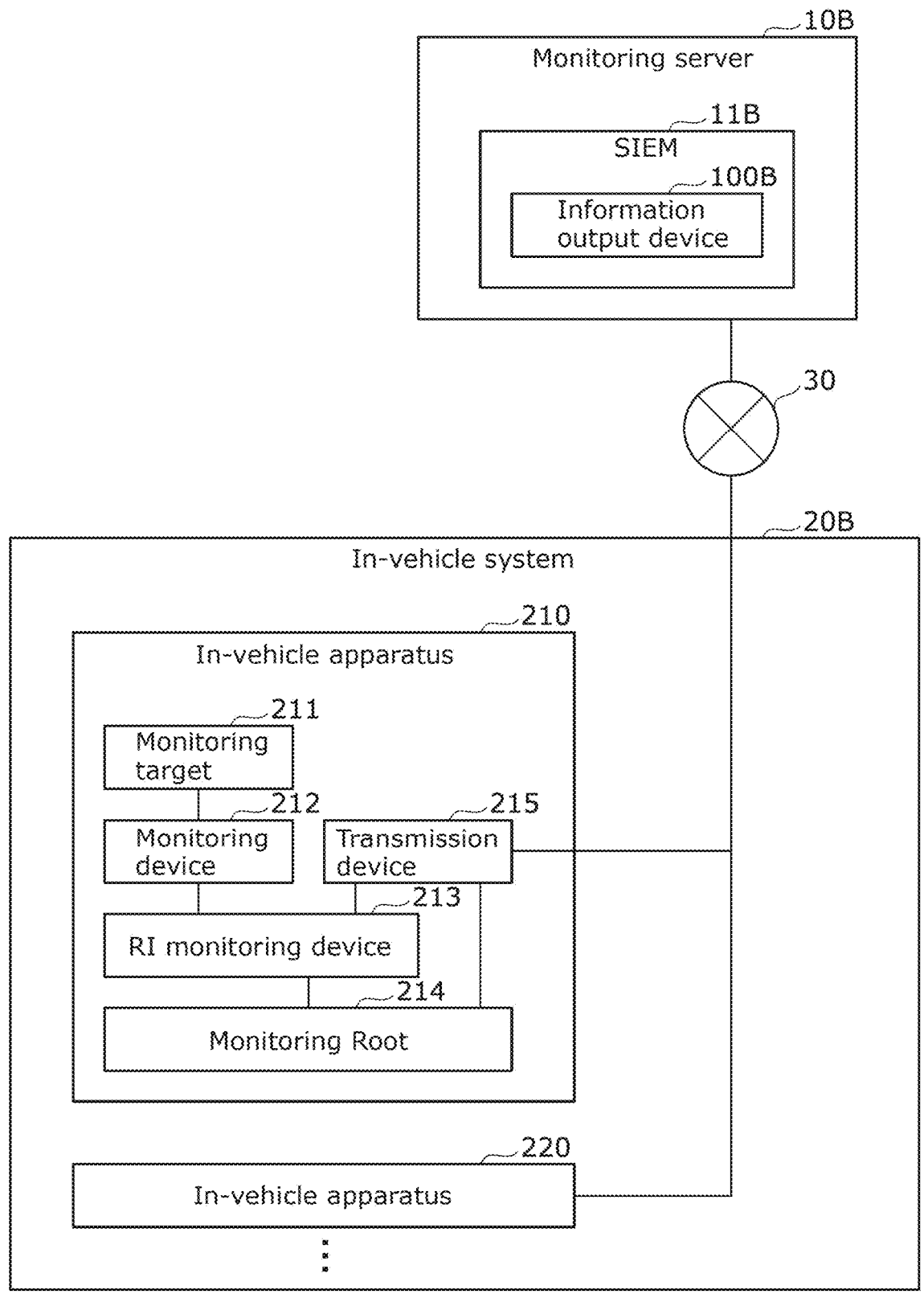
FIG. 15 is a diagram illustrating the configurations of a monitoring server and an in-vehicle system in Variation 2.
Figure 16:
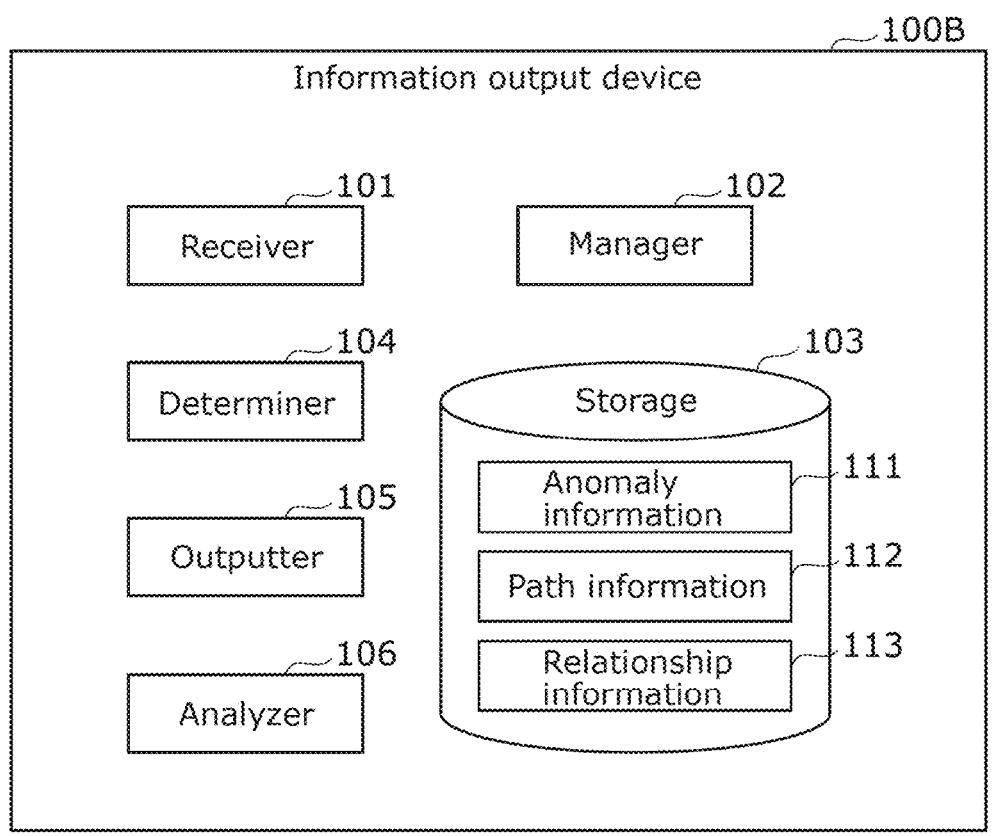
FIG. 16 is a diagram illustrating the configuration of an information output device in Variation 2.

FIG. 15 is a diagram illustrating the configurations of a monitoring server and an in-vehicle system in Variation 2. FIG. 16 is a diagram illustrating the configuration of an information output device in Variation 2.

Monitoring server 10B includes SIEM 11B, which includes information output device 100B. That is, Variation 2 illustrates an example in which SIEM 11B has the functions of information output device 100 described in the above embodiment.

In-vehicle system 20B includes in-vehicle apparatuses 210 and 220 but does not include information output device 100. In-vehicle system 20B transmits monitoring logs generated in in-vehicle apparatuses 210 and 220 to monitoring server 10B over external network 30.

Information output device 100B in monitoring server 10B processes the received monitoring logs as in the above embodiment and outputs monitoring information to analyzer 106.

Analyzer 106 collects logs or data that are output from multiple systems to analyze the logs or data, thereby monitoring a network and detecting incidents such as cyberattacks and malware infection. Analyzer 106 may have a function of displaying the analysis result.

Variation 3

In Variation 2 above, storage 103 in information output device 100B in SIEM 11B stores anomaly information 111, path information 112, and relationship information 113. Alternatively, static information based on the configuration of in-vehicle system 20B, such as path information 112 and relationship information 113, may be stored in vehicle information server 120.

Figure 17:
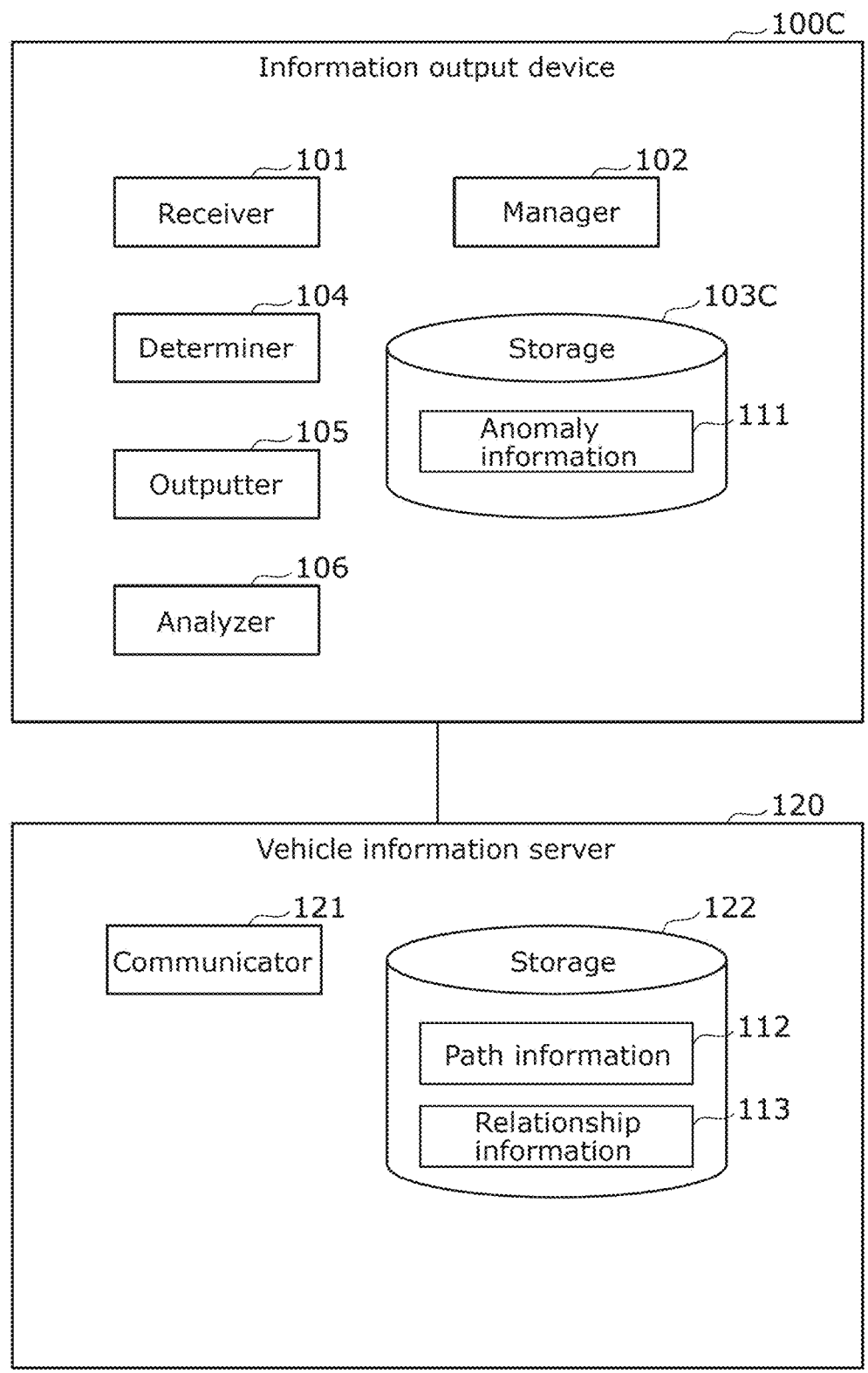
FIG. 17 is a diagram illustrating the configuration of an information output device in Variation 3.

FIG. 17 is a diagram illustrating the configuration of an information output device in Variation 3.

Information output device 100C according to Variation 3 differs from information output device 100B according to Variation 2 in that information output device 100C includes storage 103C that stores anomaly information 111 but not path information 112 nor relationship information 113. Information output device 100C further differs from information output device 100B according to Variation 2 in that information output device 100C is communicatively connected to vehicle information server 120 and obtains path information 112 and relationship information 113 from vehicle information server 120.

Vehicle information server 120 includes communicator 121 and storage 122. In response to receiving a request for path information 112 and relationship information 113 from information output device 100C, communicator 121 accordingly transmits path information 112 and relationship information 113 to information output device 100C.

Storage 122 stores path information 112 and relationship information 113. Path information 112 and relationship information 113 here may be managed for each vehicle type or for each type of in-vehicle system 20B. Communicator 121 may retrieve, from storage 122, path information 112 and relationship information 113 corresponding to the vehicle type or the type of in-vehicle system 20B indicated in the request, and transmit retrieved path information 112 and relationship information 113 to information output device 100C.

As described above, the verification system according to the present disclosure has been described based on the above-described embodiment and its variations. The present disclosure is not limited to the embodiment and the variations. The above-described embodiment and the variations to which various modifications conceived by those skilled in the art are applied may be included within the present disclosure without departing from the gist of the present disclosure.

Note that, in the above-described embodiment, the constituent elements may be configured with dedicated hardware or may be implemented by executing a software program suitable for the constituent elements. The constituent elements may be implemented by a program executor such as a central processing unit (CPU) or a processor reading and executing a software program recorded in a recording medium such as a hard disk or a semiconductor memory. Here, pieces of software that implement the verification devices and the like in the above-described embodiments are computer programs that cause a computer to execute the steps in each of the flowcharts or the sequence diagram illustrated in FIG. 7 to FIG. 10.

The present disclosure may also include the following cases.

(1) At least one device described above may be implemented as a computer system that includes a microprocessor, a ROM, a RAM, a hard disk unit, a display unit, a keyboard, a mouse, and so forth. The RAM or the hard disk unit stores a computer program. The microprocessor's operating in accordance with the computer program enables its function. Here, the computer program is a collection of command codes that indicate instructions to the computer for achieving a predetermined function.

(2) One or more of the structural components included in at least one device described above may be implemented as a single system large scale integration (LSI). A system LSI is a super-multifunctional LSI fabricated by integrating a plurality of structural components on a single chip. The system LSI is more specifically a computer system that includes a microprocessor, a ROM, a RAM, and so forth. The RAM stores a computer program. The microprocessor's operating in accordance with the computer program enables the system LSI to achieve its function.

(3) One or more of the structural components included in at least one device described above may be implemented as an integrated circuit (IC) card or a single module removable from each device. The IC card or the module is a computer system that includes a microprocessor, a ROM, a RAM and so forth. The IC card or the module may include the super-multifunctional LSI described above. The microprocessor's operating in accordance with a computer program enables the IC card or the module to achieve its function. Such IC card or module may be tamper resistant.

(4) The present disclosure may also be the above-described method. The present disclosure may also be a computer program that enables such method to be implemented by a computer, or digital signals that form the computer program.

Moreover, the present disclosure may be implemented as the computer program or digital signals recorded on a computer-readable recording medium such as a flexible disk, a hard disk, a Compact Disc (CD)-ROM, a DVD, a DVD-ROM, a DVD-RAM, a Blu-ray (registered trademark) disc (BD), and a semiconductor memory. The present disclosure may also be digital signals recorded in such recording medium.

Moreover, the present disclosure may transmit the computer program or the digital signals via, for example, a telecommunication line, a wireless or wired communication line, a network represented by the Internet, and data broadcasting.

Moreover, the present disclosure may also be achieved by transmitting the program or the digital signals recorded on the recording medium or by transmitting the program or the digital signals via, for example, the network, thereby enabling another independent computer system to carry out the present disclosure.

While various embodiments have been described herein above, it is to be appreciated that various changes in form and detail may be made without departing from the spirit and scope of the present disclosure as presently or hereafter claimed.

Further Information About Technical Background to This Application

The disclosures of the following patent applications including specification, drawings, and claims are incorporated herein by reference in their entirety: Japanese Patent Application No. 2022-165404 filed on Oct. 14, 2022, and PCT International Application No. PCT/JP2023/034110 filed on Sep. 20, 2023.

Industrial Applicability

The information output device and the like according to the present disclosure are applicable to, for example, electronic equipment installed in a vehicle, a server, etc.

The invention claimed is:

1. An information output device that receives monitoring logs generated by a plurality of monitoring devices including a 5 first monitoring device and a second monitoring device, and outputs monitoring information including the monitoring logs, the second monitoring device monitoring the first monitoring device and having security privilege higher than security privilege of the first monitoring device, the information output device comprising:
memory; and
a processor coupled to the memory, wherein
the processor, by using the memory, operates as:
a receiver that sequentially receives monitoring logs, each monitoring log including: device information indicating one monitoring device of the plurality of monitoring devices; and a monitoring result indicating whether a monitoring target of the one monitoring device has an anomaly;
a manager that manages a first state based on the monitoring result included in each monitoring log sequentially received, the first state being a state of anomaly occurrence in the monitoring target of each of the plurality of monitoring devices;
a storage that stores path information indicating transmission paths, each transmission path having a different one of the plurality of monitoring devices as a source of a monitoring log, each transmission path being indicated by one or more devices through which a monitoring log transmitted by the source passes;
a determiner that identifies, based on a first transmission path in the path information corresponding to the monitoring target of the monitoring device indicated by the device information included in the received monitoring log, and based on the first state, a second state that is a state of anomaly occurrence in a monitoring target of each of the one or more monitoring devices indicated by the first transmission path, and determines, based on the identified second state, a reliability level of the received monitoring log;

and an outputter that outputs, based on the reliability level, monitoring information including the monitoring log to a monitoring server.

2. The information output device according to claim 1, wherein a plurality of devices including the plurality of monitoring devices constitute a plurality of monitoring relationships, each of the plurality of monitoring relationships indicates a pair of a monitor and a monitoring target, the storage stores relationship information indicating the plurality of monitoring relationships, and based on the first transmission path, the first state, and the relationship information, the determiner identifies the second state as (i) normal, (ii) anomalous, or (iii) being monitored by an anomalous device having an anomaly among the plurality of devices.

3. The information output device according to claim 2, wherein a first reliability level of a first monitoring log that has passed through a device being monitored by the anomalous device is determined to be higher than a second reliability level of a second monitoring log that has passed through the anomalous device.

4. The information output device according to claim 1, wherein the determiner calculates a degree of anomaly of each of the one or more devices indicated by the first transmission path and, based on a sum of one or more degrees of anomaly calculated, determines the reliability level of the received monitoring log.

5. The information output device according to claim 1, wherein the manager determines whether a predetermined reset condition is satisfied and, if the reset condition is determined to be satisfied, updates, to a normal state, the state of anomaly occurrence in each of one or more specific devices specified by the reset condition among one or more devices indicated as not normal by the first state.

6. The information output device according to claim 1, wherein the monitoring information further includes reliability level information indicating the reliability level.

7. The information output device according to claim 6, wherein the reliability level information is information indicating whether the monitoring log included in the monitoring information is reliable.

8. The information output device according to claim 7, wherein, as the reliability level information, the monitoring log in the monitoring information is invalidated to indicate that the monitoring log is unreliable.

9. The information output device according to claim 6, wherein the reliability level indicated by the reliability level information is represented as a numerical value, with larger values indicating higher reliability.

10. The information output device according to claim 1, wherein the outputter determines whether the monitoring log is reliable based on the reliability level and, if the monitoring log is unreliable, avoids outputting the monitoring information.

11. The information output device according to claim 1, wherein the outputter determines whether the monitoring log is reliable based on the reliability level and, if the monitoring log is unreliable, outputs the monitoring information to an accumulation device that accumulates a history of the state of anomaly occurrence.

12. An information output method including: receiving monitoring logs generated by a plurality of monitoring devices including a first monitoring device and a second monitoring device; and outputting monitoring information including the monitoring logs, the second monitoring device monitoring the first monitoring device and having security privilege higher than security privilege of the first monitoring device, the method comprising:

sequentially receiving monitoring logs, each monitoring log including: device information indicating one monitoring device of the plurality of monitoring devices; and a monitoring result indicating whether a monitoring target of the one monitoring device has an anomaly;

managing a first state based on the monitoring result included in each monitoring log sequentially received, the first state being a state of anomaly occurrence in the monitoring target of each of the plurality of monitoring devices;

obtaining path information indicating transmission paths, each transmission path having a different one of the plurality of monitoring devices as a source of a monitoring log, each transmission path being indicated by one or more devices through which a monitoring log transmitted by the source passes;

identifying, based on a first transmission path in the path information corresponding to the monitoring target of the monitoring device indicated by the device information included in the received monitoring log, and based on the first state, a second state that is a state of anomaly occurrence in a monitoring target of each of the one or more monitoring devices indicated by the first transmission path;

determining, based on the identified second state, a reliability level of the received monitoring log;

and outputting, based on the reliability level, monitoring information including the monitoring log to a monitoring server.

13. A non-transitory computer-readable recording medium storing a program for causing a computer to execute the information output method according to claim 12.

* * * * *